US012362926B1

(12) United States Patent
Huang et al.

(10) Patent No.: US 12,362,926 B1
(45) Date of Patent: Jul. 15, 2025

(54) FULL-LINK DATA SECURITY PROTECTION METHOD AND SYSTEM

(71) Applicant: JINAN UNIVERSITY, Guangzhou (CN)

(72) Inventors: Feiran Huang, Guangzhou (CN); Youqiong Xiong, Guangzhou (CN); Zhiquan Liu, Guangzhou (CN); Jian Weng, Guangzhou (CN)

(73) Assignee: JINAN UNIVERSITY, Guangzhou (CN)

( * ) Notice: Subject to any disclaimer, the term of this patent is extended or adjusted under 35 U.S.C. 154(b) by 39 days.

(21) Appl. No.: 18/961,542

(22) Filed: Nov. 27, 2024

(30) Foreign Application Priority Data

Feb. 22, 2024 (CN) .......................... 202410194540.1

(51) Int. Cl.
*H04L 9/08* (2006.01)
*H04L 9/14* (2006.01)
(Continued)

(52) U.S. Cl.
CPC .......... *H04L 9/0861* (2013.01); *H04L 9/0819* (2013.01); *H04L 9/0847* (2013.01);
(Continued)

(58) Field of Classification Search
None
See application file for complete search history.

(56) References Cited

U.S. PATENT DOCUMENTS

| 6,950,517 B2 * | 9/2005 | Hawkes | H04L 9/0643 713/168 |
| 8,108,678 B1 * | 1/2012 | Boyen | H04L 9/0847 713/176 |

(Continued)

FOREIGN PATENT DOCUMENTS

| CN | 101227271 B | 7/2008 | |
| CN | 105376054 A * | 3/2016 | ........... H04L 9/0656 |

(Continued)

OTHER PUBLICATIONS

Zhou Hao, Ma Jian feng, Liu Zhiquan, Wang libo, Wu Yongdong, Fan Wenjie "Blockchain-assisted solution for emergency message trust evaluation in the VANET" «Journal of Xidian University» No. 4, Apr. 11, 2023 (Apr. 11, 2023), full text.
(Continued)

*Primary Examiner* — Ali H. Cheema
(74) *Attorney, Agent, or Firm* — JEEN IP LAW, LLC

(57) ABSTRACT

A full-link data security protection method and a system are provided. The method includes: at a data creation and collection stage: building a data security identification; at a data transmission and storage stage: dividing the ciphertext file into blocks to generate ciphertext components; calculating a virtual index and a data label; transmitting the ciphertext components to a distributed hash table (DHT) network; uploading a tuple including the virtual index, the data block, and the data label to a cloud server; at a data processing and exchange stage: applying re-encryption based on a re-encryption key generation algorithm; performing decryption
(Continued)

to obtain the signed identifier and a secret value; acquiring a tuple having a ciphertext component associated with the virtual index. Attribute-based proxy re-encryption is used to achieve fine-grained access control for the cloud storage. In the data destruction stage, the DHT network automatic updating utility is leveraged to realize data self-destructing.

10 Claims, 5 Drawing Sheets

(51) Int. Cl.
　　*H04L 9/30*　　　(2006.01)
　　*H04L 9/32*　　　(2006.01)
(52) U.S. Cl.
　　CPC .............. *H04L 9/085* (2013.01); *H04L 9/14* (2013.01); *H04L 9/3073* (2013.01); *H04L 9/3231* (2013.01); *H04L 9/3263* (2013.01); *H04L 2209/16* (2013.01)

(56) References Cited

U.S. PATENT DOCUMENTS

| | | | |
|---|---|---|---|
| 12,200,110 B2 * | 1/2025 | Yu | H04L 9/14 |
| 2002/0095454 A1 * | 7/2002 | Reed | H04L 67/5682 709/212 |
| 2022/0253516 A1 * | 8/2022 | Chung | G06F 21/32 |

FOREIGN PATENT DOCUMENTS

| | | | | |
|---|---|---|---|---|
| CN | 107707354 A | * | 2/2018 | |
| CN | 108111313 A | * | 6/2018 | ......... H04L 67/1097 |
| CN | 108632032 B | | 10/2018 | |
| CN | 110474645 A | * | 11/2019 | ......... G06F 12/0802 |
| CN | 111800424 A | * | 10/2020 | |
| CN | 111884815 A | | 11/2020 | |
| CN | 112019591 B | | 12/2020 | |
| CN | 112434343 A | * | 3/2021 | ............. G06F 21/64 |
| CN | 113194082 A | * | 7/2021 | ............. G06F 16/27 |
| CN | 114710370 A | * | 7/2022 | |
| CN | 115330383 A | * | 11/2022 | |
| CN | 115529123 A | * | 12/2022 | |
| CN | 116132105 A | * | 5/2023 | ......... H04L 63/0442 |
| ES | 2251415 T3 | * | 5/2006 | ............. G06Q 20/00 |
| JP | 2002101092 B2 | | 4/2002 | |
| WO | WO-2020133032 A1 | * | 7/2020 | |
| WO | WO-2024000430 A1 | * | 1/2024 | |

OTHER PUBLICATIONS

Wu Mingli "Research on Attribute-based Searchable Encryption in Cloud Storage" «CMFD, Information Technology» No. 4, Apr. 15, 2022 (Apr. 15, 2022), pp. 1-61.

Abdelrahn1an Altigani, etc. "Key-dependent Advanced Encryption Standard" «2018 International Conference on Computer, Control, Electri cal, and Electronics Engi neeri ng (ICCCEEE), Nov. 1, 2018 (Nov. 1, 2018 ), full text.

* cited by examiner

FULL-LINK DATA SECURITY PROTECTION METHOD AND SYSTEM

CROSS-REFERENCE TO RELATED APPLICATIONS

This application claims priority to Chinese Patent Application No. 202410194540.1, filed on Feb. 22, 2024, which is hereby incorporated by reference in its entirety.

TECHNICAL FIELD

The present disclosure relates to the field of data security technology and, in particular, to a full-link data security protection method and system.

BACKGROUND

A data lifecycle faces security concerns in six stages: data collection, data transmission, data storage, data processing, data exchange, and data destruction. On one hand, data need to pass through all stages of the lifecycle, each stage with a distinct set of vulnerability issues severely challenging data security protection. On the other hand, in the context of proliferating big data and advancing network technology, various stages in data generation and usage are experiencing dynamic evolution very rapidly, with surging data volume. Safeguarding data simply cannot be brushed aside. Cryptography technology plays a key role in every link of the data lifecycle, lending a firm hand to the safety of data. To effectively defend the data at various stages, it will be imperative to create a full-link data protection technology featuring comprehensive protections that broadly target at various security risks at all stages throughout the entire data lifecycle.

The flow and application of data can involve multiple participants and institutions, and data sharing is a must in various critical aspects of storage, transmission, and processing in order to support various business demands and innovative applications. However, existing data security protection technologies are typically designed narrowly towards some isolated scenarios or stages, missing out on a thorough and a holistic view. That is where the limitation lies. Throughout the entire lifecycle of data, from collection, storage, transmission, processing to destruction, each stage faces potential vulnerability threats. Existing art mainly focus on the protection of individual stages, lacking a comprehensive strategy for full-link security protection. Very few schemes bring together access control, data encryption and data destruction together to design a full-link data security protection solution that provides protection for the entire lifecycle of data. For example, for the data destruction stage, Xiong Jinbo et al. have proposed a secure data self-destructing scheme characterized by leveraging the automatic update utility of network nodes to discard ciphertext components to render the ciphertext unrecoverable. However, this scheme does not use proxy re-encryption, nor does it consider the security attributes of the data, and even less, the integrity verification technology for the data.

Therefore, an immediate technical problem to be solved is about how to design a full-link data security protection technology that keep in view all of the secure storage of data, the security attributes of data, the integrity verification of the data, and on-demand and automatic data destruction.

SUMMARY

In order to overcome the defects and shortcomings of the existing art, the present disclosure provides a full-link data security protection method and a system. The present disclosure takes data security attributes as attribute inputs, establishes data security policies, and then converts them into user attributes to implement access control. By using this attribute-based proxy re-encryption scheme for encryption, cloud data storage is achieved during the data storage phase, realizing fine-grained access control. This ensures secure storage of data in view of the data security attributes. Data integrity is also verified, and on-demand and automatic data destruction is achieved.

To achieve the aforementioned objectives, the present disclosure adopts the following technical solutions.

The present disclosure provides a full-link data security protection method, which includes the following steps:

initializing a key generation center and generating public parameters;

registering, by a data owner with the key generation center using an identity $ID_u$ of the data owner; calculating, by the key generation center, a public key for verifying a signature of the data owner; generating, by the data owner, a private key; and signing a ciphertext based on the private key; and registering, by a data user with the key generation center using an identity $ID_t$ of the data user; generating, by the key generation center, a private key for the data user for signing; and signing, by the data user, an operation message based on the private key;

at a data creation and collection stage: building a data security identification based on a category and security level of an object data; and verifying a signed identifier;

acquiring, by a hub node, a data security attribute set; generating, by the data owner, a symmetric key based on a symmetric encryption algorithm; encrypting a plaintext file with the symmetric key to generate a ciphertext file; and associating the symmetric key with a security attribute of an encrypted data for implementing access control; and generating, by the hub node, a decryption key;

at a data transmission and storage stage: dividing, by the data owner, the ciphertext file into blocks to generate ciphertext components; calculating, by the data owner, a virtual index and a data label for a data block; transmitting the ciphertext components to a distributed hash table, DHT, network; and uploading a tuple including the virtual index, the data block, and the data label to a cloud server;

at a data processing and exchange stage: applying, by the hub node, re-encryption based on a re-encryption key generation algorithm to generate a re-encrypted ciphertext; acquiring, by the data user, the re-encrypted ciphertext, which is decrypted to obtain the signed identifier and a secret value; generating multiple distribution indexes based on the signed identifier; acquiring from the DHT network a tuple having a ciphertext component associated with the index; calculating, by the data user, a virtual index based on the signed identifier; acquiring the tuple consisting of the virtual index, the data block and the data label from the cloud server; verifying, by the data user, integrity of the ciphertext via a data signature and a ciphertext label; recovering the data blocks of the ciphertext file corresponding to the ciphertext components using a Lagrange interpolation method; assembling the data blocks to acquire a complete ciphertext file that is decrypted to obtain the plaintext file based on the symmetric key;

at a data destruction stage: under a preset condition, discarding, by the DHT network, an index tuple associated with a stored ciphertext component based on a data security identification.

In some embodiments of the present disclosure, the public parameters of the key generation center are denoted as:

$$G_1, G_2, q, e, P, PK_T, H_1, g, H_2, H_3,$$

where $G_1$ denotes a cyclic additive group, $G_2$ denotes a cyclic multiplicative group, q denotes a prime number, e denotes a bilinear mapping, P denotes a generator of a cyclic additive group $G_1$, $PK_T$ denotes a public key of the key generation center, g denotes a key calculation algorithm, $H_1$ and, $H_2$ and $H_3$ each denote a hash function.

In some embodiments of the present disclosure, after a request for registration by a data owner is received, the key generation center: selects a random number $r_i$; selects a secret value $S_{ki}$ shared with the data owner; selects a secret value $S_{ti}$ shared between the data owner and the data user; and calculates the public key for verifying the signature of the data owner, denoted as:

$$V_i = S_{ki} \oplus ID_u;$$

where $\oplus$ denotes exclusive OR;
transmitting, by the key generation center, a <$D_i$, $S_{ki}$, $S_{ti}$, $S_i$> to the data owner;
where $D_i = (D_{i,1}, D_{i,2})$, $D_{i,1} = r_i P$, $D_{i,2} = V_i \oplus H_1(S_{ti} \cdot D_{i,1})$ and $S_i = SK_T \cdot H_1(V_i)$, the P denotes a generator of a cyclic additive group $G_1$, $H_1$ denotes a hash function, $SK_T$ denotes a random number $SK_T \in Z_p^*$ taken as a private key of the key generation center, and $Z_p^*$ denotes positive prime integers.

In some embodiments of the present disclosure, the data owner $DO_i$ calculates the private key by:

$$sk_i = S_i + S_{ti} \cdot S_i \cdot H_2(D_i \| t_i),$$

where $\|$ denotes concatenation of bit strings, and $t_i$ denotes the time the private key is generated.

In some embodiments of the present disclosure, the generating, by the data owner, a symmetric key based on a symmetric encryption algorithm; encrypting a plaintext file with the symmetric key to generate a ciphertext file includes: for achieving fine-grained access control, encrypting the symmetric key to form a ciphertext denoted as:

$$E = (A, E' = (s \| SID) \cdot K_1^a, \{E_{ci} = pt_{ci}^a\}_{1 \le ci \le l});$$

$$s = K_s;$$

$$pt_{ci} = g_1^{tci};$$

$$K_1 = e(g_1, g_2)^y;$$

where A denotes the data security attribute set, $K_s$ denotes the symmetric key, SID denotes the signed identifier, a denotes a random number, $\|$ denotes concatenation of bit strings, $t_{ci}$ denotes l random numbers selected for l attributes in the data security attribute set, $t_{ci} \in Z_p^*$, $1 \le ci \le l$, $Z_p^*$ denotes positive prime integers, $g_1$ denotes a generator of a cyclic multiplicative group G', e denotes a bilinear mapping, and y denotes a random number.

In some embodiments of the present disclosure, the dividing, by the data owner, the ciphertext file into blocks to generate ciphertext components; calculating, by the data owner, a virtual index and a data label for a data block specifically includes:

dividing, by the data owner, the ciphertext file into v data blocks and from which, extracting data blocks $CM$, with remaining data blocks being denoted as $M_{dso}$,
where the virtual index is denoted as:

$$\zeta_c = c \cdot SID,$$

where c denotes an index corresponding to a message block $m_c$, $m_c \in M_{dso}$, and SID denotes the signed identifier,
where the data label is denoted as:

$$\sigma_{y_c} = (\sigma_{m_c}, D_i, Y_c, T_i, t_i);$$

$$\sigma_{m_c} = sk_i + \delta_c \cdot y_c;$$

$$Y_c = y_c \cdot P;$$

$$\delta_c = H_3(D_i \| Y_c \| m_c \| T_i \| \zeta_c),$$

where $sk_i$ denotes a private key of the data owner, P denotes a generator of a cyclic additive group $G_1$, $H_3$ denotes a hash function, $y_c$ denotes a random number, and $T_i$ denotes a timestamp of the signature.

In some embodiments of the present disclosure, for the transmitting the ciphertext components to the DHT network, the ciphertext components are denoted as:

$$S_{cs} = (C_{s1}, \ldots, C_{si}, \ldots, C_{sN});$$

$$C_{si} = (Q_1(x_i), Q_2(x_i), \ldots, Q_{v+1}(x_i));$$

$$Q_1(x) = CM_1 + o_1 x^1 + o_1 x^2 + \ldots + o_{k-1} x^{k-1};$$

$$Q_i(x) = CM_i + o_1 x^1 + o_1 x^2 + \ldots + o_{k-1} x^{k-1};$$

$$Q_v(x) = CM_v + o_1 x^1 + o_1 x^2 + \ldots + o_{k-1} x^{k-1};$$

$$Q_{v+1}(x) = Cc + o_1 x^1 + o_1 x^2 + \ldots + o_{k-1} x^{k-1};$$

$$Cc = H_2(CM_1 \| CM_2 \| \ldots \| CM_v);$$

$$CM \; 32 \; \{CM_1, CM_2, \ldots, CM_v\},$$

where $o_{k-1}$ denotes k−1 numbers selected from a finite field, $H_2$ denotes a hash function;
using a data identification SID as a seed for a secure pseudo-random number generator to generate N distribution indexes l1, l2, ..., lN; producing, from the ciphertext components associated with the indexes, N tuples <li, $C_{si}$>; and distributing all of the tuples to a DHT network node for storage.

In some embodiments of the present disclosure, the applying, by the hub node, re-encryption based on a re-encryption key generation algorithm to generate a re-encrypted ciphertext is denoted as:

$$C_b = (A', E' = (s \| SID) \cdot K_1^{a \cdot r}, \{E_{ci}' = ((pt_{ci}^a)^{RK_{ci}^{Alice \to Bob}})_{T_i}\}_{1 \le ci \le l});$$

$$RK_i^{Alice \to Bob} = t'_{|\text{hp'}|} / t_{|\text{hp'}|};$$

$$s = K_s;$$

$$pt_{ci} = g_1^{tci};$$

$$K_1 = e(g_1, g_1)^y,$$

where A' denotes the data security attribute set, $t_{ci}$ denotes a random number selected from the data security attribute set, $\psi$ and $\psi'$ denote an access control hierarchy defined by a data attribute and an access control hierarchy defined by a user attribute, $K_s$ denotes the symmetric key, SID denotes the signed identifier, a denotes a random number, ∥ denotes concatenation of bit strings, $g_1$ denotes a generator of a cyclic multiplicative group G', e denotes a bilinear mapping, and y denotes a random number.

In some embodiments of the present disclosure, the verifying, by the data user, integrity of the ciphertext specifically includes:

verifying, by the data user, $CM_1'$, $CM_2'$, . . . , $CM_v'$ regenerated from extracted ciphertext components; and determining whether $H_2(CM_1'\|CM_2'\| \ldots \|CM_v')$ equals to $C_c$;

verifying v corresponding tuples $(\zeta_c, m_c, \sigma_{v_c})$ returned from the cloud server; for each tuple, calculating $\delta_c = H_3(D_i\|Y_c\|m_c\|T_i\|\zeta_c)$; and batch verifying the equation:

$$e\left(\sum_{c=1}^{v}\sigma_{m_c}, P\right) = e\left(\sum_{c=1}^{v}H_1(V_1)(1+S_{ti}\cdot H_2(D_i\|t_i)), PK_T\right)e\left(\sum_{c=1}^{v}\delta_c\cdot Y_c\right),$$

where $H_3$ denotes a hash function, $V_i$ denotes the public key signed by the data owner, and $S_{ti}$ denotes a secret value shared between the data owner and the data user.

The present disclosure also provides a full-link data security protection system, including: an initialization module, a key generation center, a data owner, a data user, a hub node, a cloud server, a DHT network, and an identifier building module, where:

the initialization module is used to: initialize the key generation center;

the key generation center is used to: generate public parameters, calculate a public key for verifying a signature of the data owner; and generate a private key for the data user for signing;

the data owner is used to: register with the key generation center using an identity $ID_u$ of the data owner; generate a private key; and sign a ciphertext based on the private key;

the data user is used to: register with the key generation center using an identity $ID_t$ of the data user; and sign an operation message based on the private key;

the identifier building module is used to: build a data security identification based on a category and security level of an object data; and verify a signed identifier;

the hub node is used to: acquire a data security attribute set; and generate a decryption key;

the data owner is further used to: generate a symmetric key based on a symmetric encryption algorithm; encrypt a plaintext file with the symmetric key to generate a ciphertext file; and associate the symmetric key with a security attribute of an encrypted data for implementing access control; and the data owner is further used to: divide the ciphertext file into blocks to generate ciphertext components; calculate a virtual index and a data label for a data block; transmit the ciphertext components to a DHT network; and upload a tuple including the virtual index, the data block, and the data label to the cloud server;

the hub node is further used to: apply re-encryption based on a re-encryption key generation algorithm to generate a re-encrypted ciphertext; the data user is further used to: acquire the re-encrypted ciphertext, which is then decrypted to obtain the signed identifier and a secret value; generate multiple distribution indexes based on the signed identifier; and acquire from the DHT network a tuple having a ciphertext component associated with the index;

the data user is further used to: calculate a virtual index based on the signed identifier; acquire the tuple consisting of the virtual index, the data block and the data label from the cloud server; verify integrity of the ciphertext via a data signature and a ciphertext label; recover the data blocks of the ciphertext file corresponding to the ciphertext components using a Lagrange interpolation method; assemble the data blocks to acquire a complete ciphertext file that is decrypted to obtain the plaintext file based on the symmetric key;

the cloud server is further used to: store a tuple including the virtual index, the data block, and the data label;

the DHT network is further used to: store the tuples generated from the ciphertext components; and under a preset condition, discard an index tuple associated with a stored ciphertext component based on a data security identification.

Compared with the existing art, the present disclosure has the following advantages and desirable effects:

(1) The present disclosure uses data security identification technology to provide the underlying information support capable of security protection at various stages throughout the data lifecycle. By identifying data, clarifying processes, implementing hierarchical control, and destroying data on demand, the security of the data can be ensured.

(2) The present disclosure employs attribute-based re-encryption technology to achieve fine-grained access control. By taking data attributes and user attributes as inputs and using an attribute-based proxy re-encryption scheme for encryption, cloud data storage can be realized during the data storage stage. The present disclosure also designs a signature verification method to ensure the confidentiality and integrity of the data.

(3) The present disclosure utilizes data self-destructing technology, which has high feasibility and adaptiveness. By automatically discarding the ciphertext components stored on network nodes, the original ciphertext cannot be recovered, thereby protecting the confidentiality of the data.

DESCRIPTION OF EMBODIMENTS

To make the objectives, technical solutions, and advantages of the present disclosure clearer, the present disclosure will be explained in more detail in the following in conjunction with the accompanying drawings and embodiments. It should be understood that the specific embodiments described herein merely serve to explain, rather than limit, the present disclosure.

Embodiment 1

Figure 1:
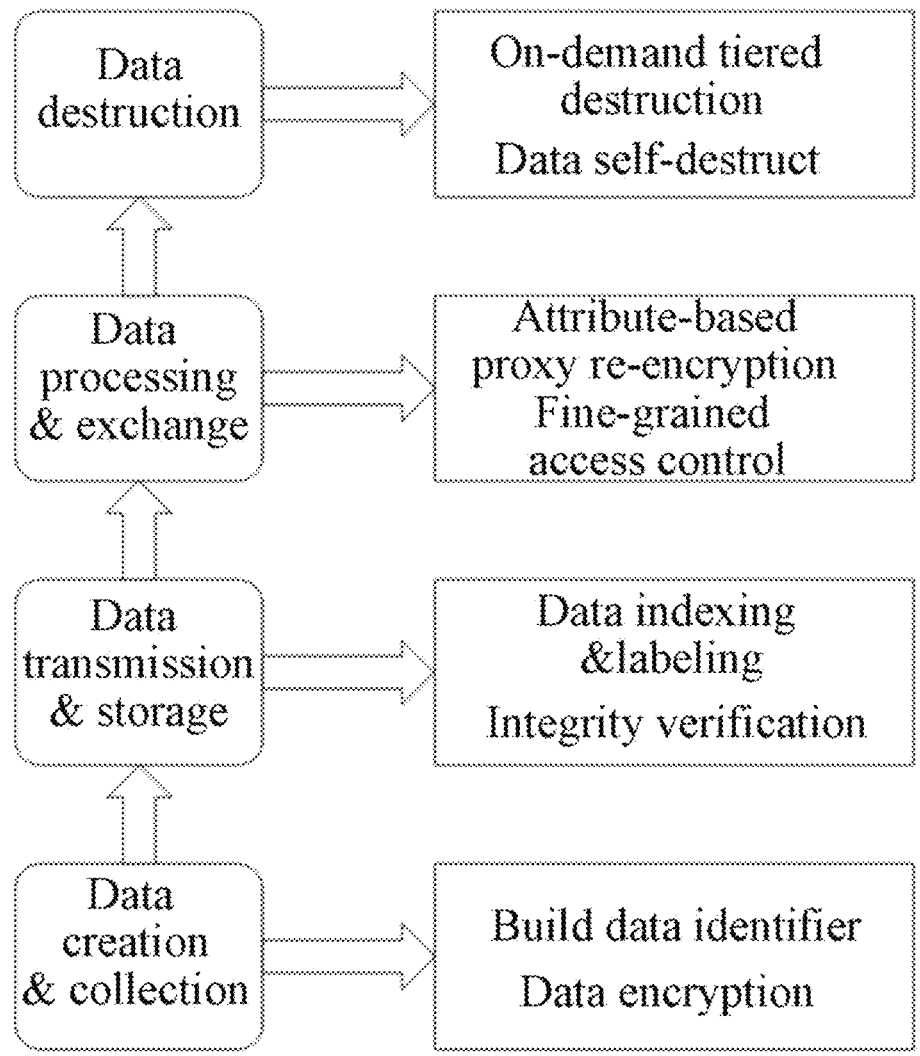
FIG. 1 is a schematic diagram of an architecture implementing a full-link data security protection method of the present disclosure.

As shown in FIG. 1, the present disclosure provides a full-link data security protection method, which includes the steps that follow.

System initialization, specifically including the following.

Initializing a KGC (key generation center) to select a cyclic additive group $G_1$ and a cyclic multiplicative group $G_2$ having the bilinear mapping property, and g denotes a key calculation algorithm. $G_1$ and $G_2$ are cyclic groups having a prime order q. A bilinear mapping may be denoted as e: $G_1 \times G_1 \rightarrow G_2$. P is a generator of $G_1$. A random number $SK_T \in Z_p^*$ is selected to be a private key for the KGC, where $Z_p^*$ are positive prime integers. Calculate a public key $PK_T = SK_T P$ of the KGC. Select three secure hash functions, with $H_1: G_1 \rightarrow Z_p^*$, $H_2: \{0,1\}^* \rightarrow Z_p^*$ and $H_3: G_1 \rightarrow Z_p^*$ each denoting a one-way hash encryption function. The public parameters of the KGC are denoted as:

($G_1$, $G_2$, q, e, P, $PK_T$, $H_1$, g, $H_2 H_3$).

The data owner $DO_i$ registers with the KGC. The data owner $Do_i$ uses its identity $ID_u$ to register with the KGC. The data owner $DO_i$ generates a private key for signature. The data owner $DO_i$ will encrypt data, and then sign the ciphertext using the private key. The data owner $DO_i$ transmits its identity $ID_u$ to the KGC. After receiving from $DO_i$ a request to register, the KGC selects a random number $r_i$, and then a secret value $S_{ki}$ shared with the data owner $DO_i$. Then, the KGC selects a secret value $S_{ti}$ shared between the data owner $DO_i$ and the data user. The KGC calculates the public key $V_i = S_{ki} \oplus ID_u$ for verifying the signature of the data owner $DO_i$, where (and afterwards) $\oplus$ denotes exclusive OR, then calculates $D_{i,1} = r_i P$, $D_{i,2} = V_i \oplus H_1(S_{ti} \cdot D_{i,1})$ and $D_i = (D_{i,1}, D_{i,2})$, and then calculates $S_i = SK_T \cdot H_1(V_i)$. The KGC will transmit $<D_i, S_{ki}, S_{ti}, S_i>$ to the data owner $DO_i$. The data owner $DO_i$ calculates its own private key as $sk_i = S_i + S_{ti} \cdot S_i \cdot H_2(D_i \| t_i)$, where (and afterwards) $\|$ denotes concatenation of bit strings, and $t_i$ denotes the time the private key is generated.

The data user $DU_j$ registers with the KGC. An organization may have multiple data users, so each data user $DU_j$ uses its own identity $ID_t$ for the registration with the KGC. In turn, the KGC generates for this data user a private key $sk_j$ of signature. The data user will, when operating on the data, use the private key to sign the operation message, hence implementing traceability for secured processing of data. Via a secured channel, the KGC transmits $X_j = V_i \| S_{ti}$ to the data user $DU_j$ for subsequent verification of the data.

Data creation and collection stage: Setup data security identification for the data owner to encrypt data locally.

In this embodiment, the data security identification is the carrier of data attributes. Security attributes are configured based on the evaluation and the sensitivity of the data. The sensitivity of the data depends on whether the data can be made public and the degree of confidentiality of the data. The data security identification is used to specify the attribute information of the data, where the attributes may include data source, data publication time, data name, data category, data evaluation rating, data sensitivity, etc. These attributes further clarify the security level and protection level required by the data. Different data categories have different contents. In case the collected data involves user privacy, K-anonymity may be used to cut off the one-to-one or one-to-many relations between the identification attributes and the sensitive attributes in the data set, preventing linking attacks. Hence, data privacy breaching may be fended off. The data security identification may be formatted to include: a signed identifier SID, attributes, and a checksum.

Figure 2:
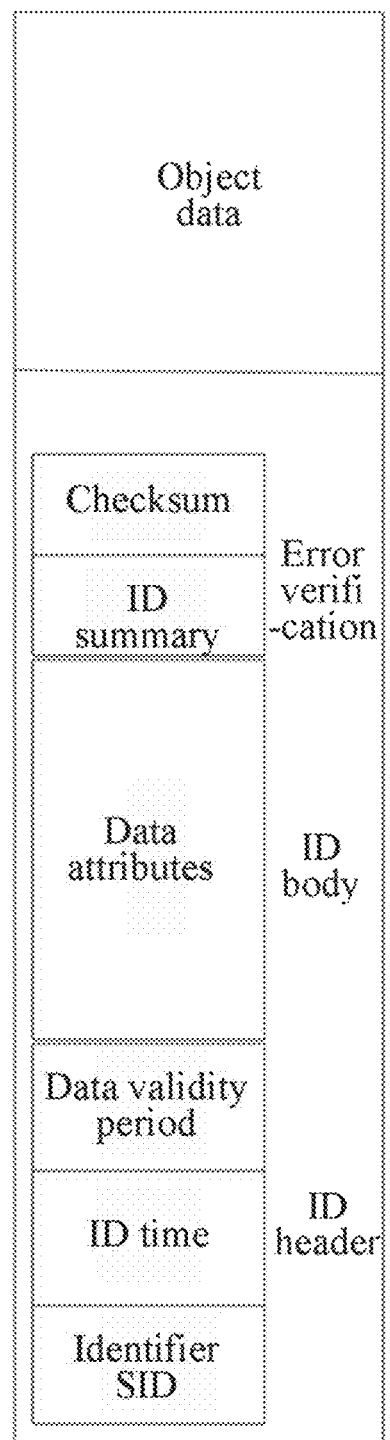
FIG. 2 is a structural diagram of a data security identification of the present disclosure.

Build data security identification during the data generation or collection stage. The data is sourced from data collectors, primarily by various sensors and information software, etc. The collected data is stored in a local storage device of the data owner. In this stage, data security identification is established. Procedures to establish data security identification: begin from building the data security identification and verifying a signed identifier based on a category and security level of an object data. Specifically, the object data can be classified according to the content of a data service or the like. The security level can be classified to be short-term confidentiality, long-term top-secret, public, etc. The data owner generates a digital identifier according to pre-established identifier encoding rules. The digital identifier takes the form of an organizational code having a binary data structure and acts as the unique ID of the data. Setup a data attribute set $A^u = (w_1, w_2, \ldots, w_w)$. The identifier SID will survive throughout the entire lifecycle of the data. As shown in FIG. 2, the data identifier is bound with the data to yield a checksum, thus completing the establishment and binding of the data security identification. This categorizes the security levels of the data and establishes different access control policies for data having different security levels. The data owner may encrypt the data according to the different security levels.

Initialize an encryption parameter: use attribute-based proxy re-encryption technology to achieve fine-grained access control. The data owner $DO_i$ uploads the data security attribute set to a hub node. The data security attribute set may be denoted as $A = (w_1, w_2, \ldots, w_l)$. The HN (hub node) selects a security parameter $1^k$ as its input, and selects a cyclic multiplication group G' of order p', with $g_1$ being a generator of G'. The HN acquires the data security attribute set $A = (w_1, w_2, \ldots, w_l)$. Here, the data security attribute set A is a subset of the data attributes $A^u$, with l denoting the number of attributes, and all of the l elements $w_1, w_2, \ldots, w_l$ of the set represent some data attributes. For the attributes in A, l random numbers $y \in Z_p^*$ are selected, hence yielding a MK (master key): $(t_1, t_2, \ldots, t_{ci}, \ldots, t_l, y)$, where $t_l$ denotes the l random numbers, $t_{ci} \in Z_p^*$, and $1 \leq ci \leq l$.

A public parameter (PK) is denoted as:

$(pt_1 = g_1^{t_2}, \ldots, pt_{ci} = g_1^{tci}, \ldots, pt_l = g_1^{t_l}, K_1 = e(g_1, g_1)^y)$.

fwhere e denotes a bilinear map.

Data encryption: the data owner $DO_i$ selects a secure symmetric encryption algorithm, with a symmetric key $K_s$, and uses the symmetric key $K_s$ to encrypt a plaintext file M to generate a ciphertext file m. The HN encrypts the key $K_s$, and set the secret value to be $s = K_s$. To encrypt s, select the data security attribute set A (a subset of the data attributes $A^u$). The security attribute set A is used for access control. Select a random number $a \in Z_p^*$, and acquire the ciphertext $E = (A, E' = (s \| SID) \cdot K_1^a, \{E_{ci} = pt_{co}^a\}_{1 \leq ci \leq l})$. The symmetric key $K_s$ is associated with the security attributes of the encrypted data, while the data user's private key is associated with an access hierarchy. Only when the access policy in the user's private key is in compliance with the data security attribute set will the data user be able to acquire the symmetric key $K_s$ and the data identifier SID.

Decryption key generation: this step is done by the HN. The access policies as practiced herein are implemented via an access control tree Tree. Each non-leaf node of the tree represents a threshold, and each leaf node describes an attribute. Tree is an access tree with root node R, and $TR_x$ represents a subtree of Tree with root node x. An attribute set $\mathcal{P}$ in compliance with the access hierarchy tree is denoted as $TR_x(\mathcal{P})=1$. An iteration to calculate $TR_x(\mathcal{P})$ follows: for x being a non-leaf node, calculate the access hierarchy tree for all child nodes x' of x as $TP_{x'}(\mathcal{P})$, and set $TP_x(\mathcal{P})=1$ if and only if at least kx child nodes return 1. For x being a leaf node, set $TP_x(\mathcal{P})=1$ if and only if $att(x) \in \mathcal{P}$. The access control tree algorithm produces a key if and only if Tree(A)=1. Hence, the attribute-based encryption method ensures that a user is granted with decryption only when the user has attributes and access policies in compliance with the access policies of the access control tree. The data user is able to decrypt messages calculated under the set of attributes A. In the access control tree, a non-leaf node x has $NM_x$ child nodes. $k_x$ acts as a threshold of x, with $0 < k_x \le NM_x$. A node is evaluated to be True when at least $k_x$ child nodes have been evaluated to be True. In particular, when $k_x=1$, the node becomes an OR gate. When $k_x=NM_x$, the node becomes an AND gate. For a leaf node, we have $k_x=1$. Some functions are defined in the following: (1) parent(x) denotes a parent node of the node x; (2) att(x) denotes attribute value(s) associated with x, where the x denotes a leaf node; (3) For a node in Tree, an order relation is defined for all of its child nodes, with numberings in the range of 1 to $NM_x$. A function index(x) returns the number associated with x, i.e., a value for the index as contained in the access hierarchy of a given key and as uniquely assigned to the node x by various means. Specifically, an access control tree Tree is built. For a node x in the tree, set $k_x$ to be a threshold for the node x. Calculate the order $d_x=k_x-1$ for the polynomial qx. From top to bottom, select for each non-leaf node x a polynomial $q_x$ of order $d_x=k_x-1$, with the root node R having $q_R(0)=y$, where y denotes a random number. For other deeper nodes, set $q_x(0)=q_{parent(x)}(index(x))$. For each leaf node x, set a secret value: $D_x=g_1^{q_x(0)/t_{ci}}$, where ci=att(x). The function att(x) is defined only when x is a leaf node and for the sole purpose of representing attributes associated with leaf nodes. These secret values are assembled into a set, which is taken to be the decryption key. Data accesses by the users are regulated according to confidentiality level information in the data security identification, preventing the users from accessing data above their access clearances.

Data transmission and data storage stages: generate ciphertext components, and upload the data to a cloud server and a DHT network, specifically including:

The data owner $DO_i$ divides the ciphertext data into blocks, generating ciphertext components. Initially, the data owner $DO_i$ divides the encrypted data file m into v data blocks $F=\{m_1', m_2', m_3', \ldots, m_v'\}$. From the v data blocks, extract $CM_1=u_1, CM_2=u_2, \ldots, CM_v=u_v$, meaning that various quantities of bits are extracted from the individual data blocks; calculates $Cc=H_2(CM_1 \| CM_2 \| \ldots \| CM_v)$, $CM=\{CM_1, CM_2, \ldots, CM_v\}$, with the remaining blocks being $M_{dso}=\{m_1, m_2, m_3, \ldots, m_v\}$. With the ciphertext components being generated, the ciphertext stored in the CS (cloud server) is no longer the entire ciphertext. This is a preparation for data destruction.

The data owner $DO_i$ calculates virtual indexes of the data blocks. The data owner uploads the data to the CS in the data format of a tuple (virtual index-data block-data label). Take as input a message block $m_c$ indexed by c, where $m_c \in M_{dso}$, calculate the virtual index $\zeta_c = c \cdot SID$. The data blocks uploaded to the cloud server will use these virtual indexes as their indexes for storage.

The data owner $DO_i$ calculates labels of the data blocks. The data owner $DO_i$ takes as input its private key $sk_i$ and an encrypted data block $m_c$ with virtual index $\zeta_c$ to calculate the data block label, and the label bears the signature of $DO_i$. $DO_i$ chooses a random $y_c$ and calculate $Y_c=y_c \cdot P$ and $\delta_c=H_3(D_i \| Y_c \| m_c \| T_i \| K_c)$. Here, $T_i$ denotes a timestamp of the signature. Then, $DO_i$ generates the relevant signature $\sigma_{m_c}=sk_i+\delta_c \cdot y_c$, and calculates the label $\sigma_{v_c}=(\sigma_{m_c}, D_i, Y_c, T_i, t_i)$.

The data owner $DO_i$ transmits the ciphertext components generated from CM to the DHT network. Since the DHT network has distributed structure, a secret sharing scheme is used to store the CM. Let there be N ciphertext components. Take a large prime number bb, and select from a finite field containing 1 to bb some k-1 numbers $o_1, o_2, \ldots, o_{k-1}$. Set the threshold value to be k, and construct v+1 Lagrange polynomials:

$$Q_1(x)=CM_1+o_1x^1+o_1x^2+ \ldots +o_{k-1}x^{k-1};$$

$$Q_i(x)=CM_i+o_1x^1+o_1x^2+ \ldots +o_{k-1}x^{k-1};$$

$$Q_v(x)=CM_v+o_1x^1+o_1x^2+ \ldots +o_{k-1}x^{k-1};$$

$$Q_{v+1}(x)=Cc+o_1x^1+o_1x^2+ \ldots +o_{k-1}x^{k-1}.$$

Calculate the ciphertext components $S_{cs}=(C_{s1}, \ldots, C_{si}, \ldots, C_{sN})$, where $C_{si}=(Q_1(x_i), Q_2(x_i), \ldots, Q_{v+1}(x_i))$.

The algorithm uses the data identification SID as a seed for a secure pseudo-random number generator to generate N distribution indexes l1, l2, ..., lN, then produces, from the ciphertext components associated with the indexes, N tuples $<li, C_{si}>$; and then distributes all of the tuples throughout a DHT network node for storage.

The data owner $DO_i$ uploads the data to the cloud server, and transmits a message to the data user.

Figure 3:
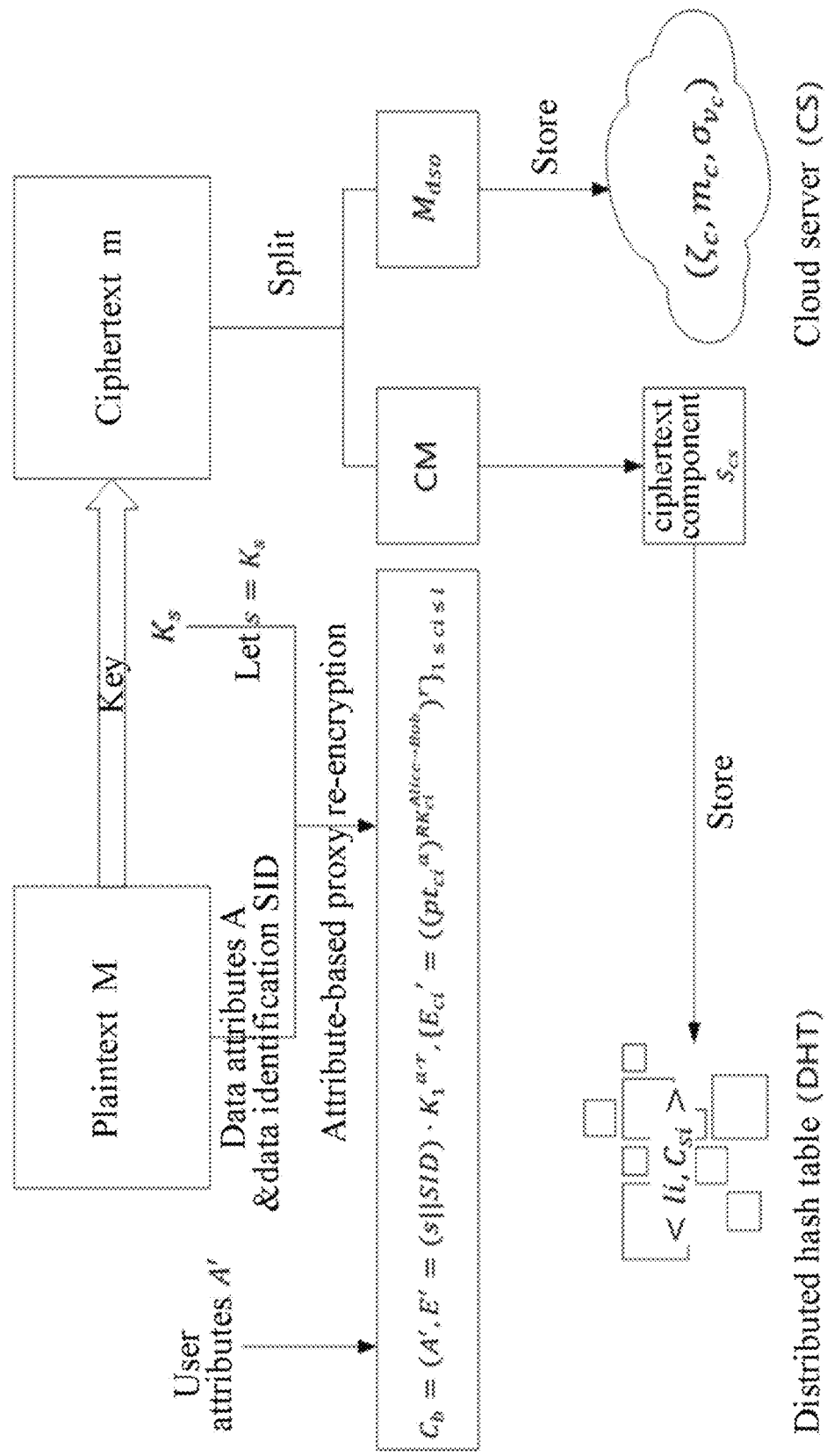
FIG. 3 is a flowchart of an encryption storage process of the present disclosure.

As shown in FIG. 3, for storing the encrypted data, the data owner $DO_i$ uploads the data to a cloud server, which is to upload the v tuples (virtual index—data block—data label) $(\zeta_c, m_c, \sigma_{v_c})$ to the cloud server CS. The cloud server would store these v tuples. The authentication between the cloud server and the data owner $DO_i$ is done in the traditional manner, i.e., account and password. The data owner $DO_i$ transmits $<c, y_c>$ to the data user, where $c \in [1, v]$. The CS stores these v tuples and an expiry time of the data. Different safekeeping strategies may be applied to the data storage based on the security level of the data identifier, with data sets having higher security levels being retained for longer periods or assigned back up plans.

Processing and exchange stage: the data user acquires a decryption key, verifies data integrity, and decrypts and uses the data. The specific steps include:

The hub node (HN) performs re-encryption. Attribute-based proxy re-encryption means that the access hierarchy can be redefined using the data user's attributes regarding acquisition of the decryption key. Initially, the re-encryption key is generated. The re-encryption key generation algorithm yields a one-way re-encryption key.

Input user attributes A'. For all attributes in A', select $t'_{ci} \in Z_p^*$, where $1 \le ci \le l$, and calculate $RK_{ci}=RK_1^{Alice \to Bob}=t'_1/t_1$, $RK_2^{Alice \to Bob}=t'_2/t_2, \ldots, RK_l^{Alice \to Bob}=t'_{|\psi'|}/t_{|\psi'|}$. Here, the access control hierarchies for Alice and Bob are, respectively, denoted as $\psi$ and $\psi'$, with $\psi'$ including no more attributes than that of $\psi$. Hence, the data attribute A defined access control hierarch $\psi$ has been converted into a user attribute A' defined access control hierarch $\psi'$. A leaf node has a secret value $D_x'=g_1^{q_x(0)/RK_{ci}}$, where ci=att(x), and the decryption key becomes D'. The hub node (HN) may employ additional information to convert the ciphertext encrypted according to the data attributes into a new ciphertext according to the user attributes.

The HN re-encrypts to acquire the ciphertext:

$$C_b = (A', E' = (s\|SID) \cdot K_1^{a \cdot r}, \{c_i' = ((pt_{ci}^a) \cdot RK_{ci}^{Alice \to Bob})^T\}_{1 \le i \le l}),$$

fwhere A' is a finite set having the complete attributes of the data user, and $r \in Z_p^*$.

Figure 4:
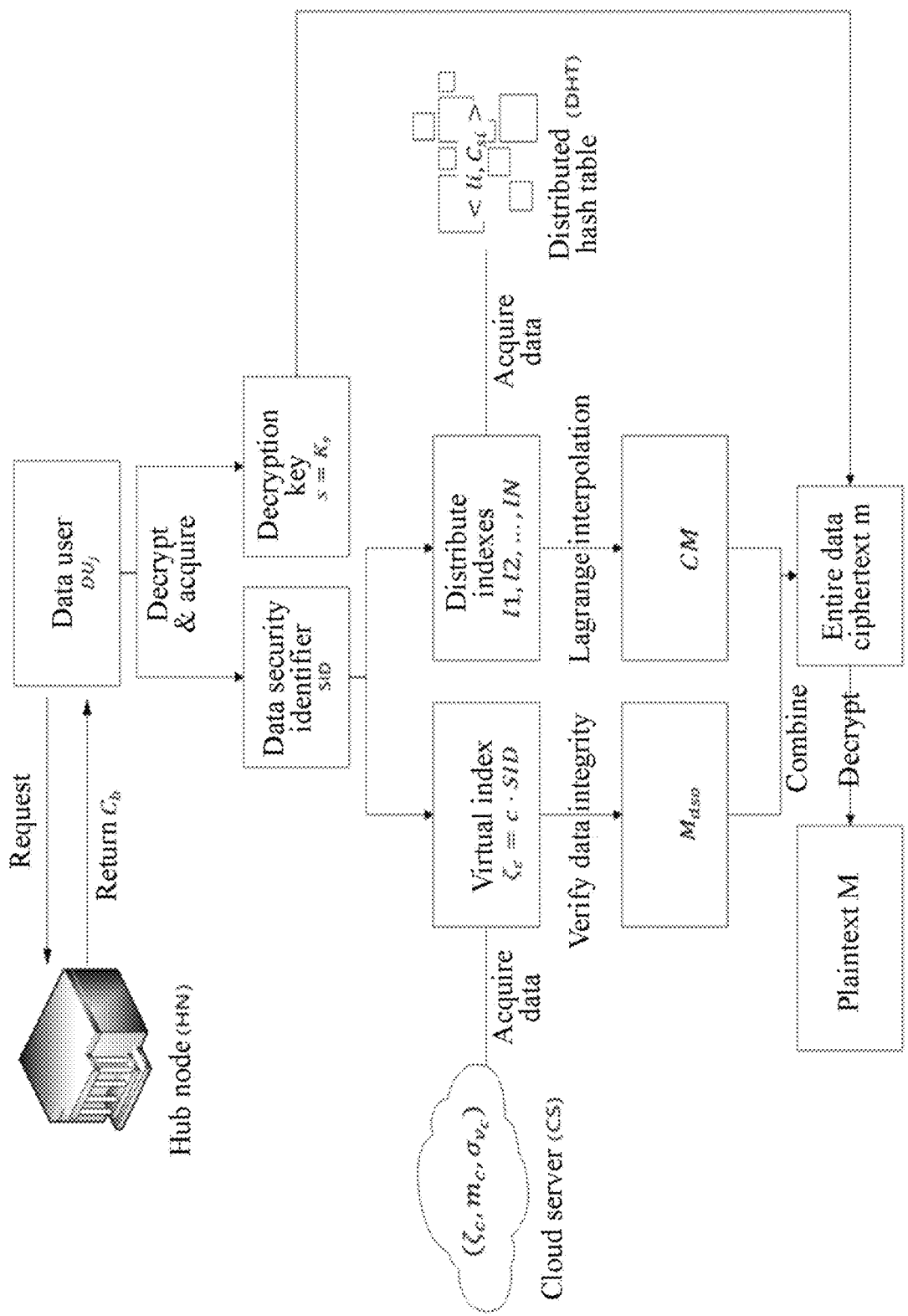
FIG. 4 is a flowchart of a decryption and verification process of the present disclosure.

The data user $DU_j$ acquires data. The data user $DU_j$ performs the decryption and verification following a procedure as illustrated in FIG. 4. The data user $DU_j$ initially receives a message from the data owner $DO_i$, and then request for the ciphertext $C_b$ from the hub node (HN). The data user $DU_j$ uploads its attribute set for the HN to determine whether the attribute set has reached a threshold. If positive, the HN returns $C_b$ to the data user $DU_j$. The user performs decryption at next step. The data user $DU_j$ concludes the decryption by obtaining SID and s, where the SID will be used as a seed for a secure pseudo-random number generator to generate N distribution indexes l1, l2, ..., lN. After that, N tuples <li, $C_{si}$> having ciphertext components associated with the index may be acquire from the DHT network. Then, $DU_j$ uses the SID to calculate the virtual index $\zeta_c$, and acquires v tuples ($\zeta_c$, $m_c$, $\sigma_{v_c}$) from the CS.

Integrity verification of the ciphertext. The data user $DU_j$ begins from verifying the $CM_1'$, $CM_2'$, ..., $CM_v'$ regenerated from the extracted ciphertext components, then calculates $H_2(CM_1'\zeta\|CM_2'\| \ldots \|CM_v')$ and determine whether it equals to Cc. Then, the data user $DU_j$ verifies the corresponding v tuples ($\zeta_c$, $m_c$, $\sigma_{v_c}$) returned from the CS. For each tuple, the data user $DU_j$ calculates $\delta_c = H_3(D_i\|Y_c\|m_c\|T_i\|\zeta_c)$, and batch verifies the equation:

$$e\left(\sum\nolimits_{c=1}^{v} \sigma_{m_c}, P\right) = e\left(\sum\nolimits_{c=1}^{v} H_1(V_i)(1 + S_{ti} \cdot H_2(D_i\|t_i)), PK_T\right) e\left(\sum\nolimits_{c=1}^{v} \delta_c \cdot Y_c\right).$$

The equation is derived as below:

$$LHS = e\left(\sum\nolimits_{c=1}^{v} \sigma_{m_c}, P\right)$$

$$= e\left(\sum\nolimits_{c=1}^{v} (sk_i + \delta_c \cdot y_c), P\right)$$

$$= e\left(\sum\nolimits_{c=1}^{v} (S_i + S_{ti} \cdot S_i \cdot H_2(D_i\|t_i) + \delta_c \cdot y_c), P\right)$$

$$= e\left(\sum\nolimits_{c=1}^{v} S_i, P\right) e\left(\sum\nolimits_{c=1}^{v} (S_{ti} \cdot S_i \cdot H_2(D_i\|t_i)), P\right) e\left(\sum\nolimits_{c=1}^{v} (\delta_c \cdot y_c), P\right)$$

$$= e\left(\sum\nolimits_{c=1}^{v} (SK_T \cdot H_2(V_i)), P\right) e\left(\sum\nolimits_{c=1}^{v} (S_{ti} \cdot SK_T \cdot H_2(V_i) \cdot H_2(D_i\|t_i)), P\right) e\left(\sum\nolimits_{c=1}^{v} \delta_c \cdot Y_c\right)$$

$$= e\left(\sum\nolimits_{c=1}^{v} H_1(V_i), SK_T \cdot P\right) e\left(\sum\nolimits_{c=1}^{v} (S_{ti} \cdot H_1(V_i) \cdot H_2(D_i\|t_i)), SK_T \cdot P\right) e\left(\sum\nolimits_{c=1}^{v} \delta_c \cdot Y_c\right)$$

$$= e\left(\sum\nolimits_{c=1}^{v} H_1(V_i), PK_T\right) e\left(\sum\nolimits_{c=1}^{v} (S_{ti} \cdot H_1(V_i) \cdot H_2(D_i\|t_i)), PK_T\right) e\left(\sum\nolimits_{c=1}^{v} \delta_c \cdot Y_c\right)$$

$$= e\left(\sum\nolimits_{c=1}^{v} H_1(V_i)(1 + S_{ti} \cdot H_2(D_i\|t_i)), PK_T\right) e\left(\sum\nolimits_{c=1}^{v} \delta_c \cdot Y_c\right)$$

$$= RHS$$

Through the data signatures and ciphertext data labels, the data user may verify the integrity of the data.

Decryption by the data user.

A data user $DU_j$ in accordance with the access policy should have acquired from the DHT network N tuples <li, $C_{si}$> associated with the ciphertext component index, and from the cloud server v tuples ($\zeta_c$, $m_c$, $\sigma_{v_c}$). The data user $DU_j$ may hence derive $S_{cs}$, and use Lagrange interpolation to recover the CM. Now, combining CM and $M_{dso}$, the entire ciphertext file m is within grasp. With the ciphertext file, the next step is to find out the symmetric key $K_s$ to decrypt the ciphertext file. To that end, the secret value $s = K_s$ need to be acquired. The algorithm would begin from recovering $e(g_1, g_1)^{r \cdot a \cdot q_r(0)}$. A recursive calculation will start from the root node. During the calculation, a secret fragment of an intermediate node is calculated by performing exponentiation operations on the fragments of all the child nodes based on a Lagrange difference factor, and then multiplying them together. Here, the Lagrange coefficients are defined to be:

$$\Delta_{i,S}(x) = \prod\nolimits_{j \in S, j \ne i} \frac{x-j}{i-j},$$

where S is a sub set of $Z_p^*$. When x is a leaf node, $e(g_1, g_1)^{r \cdot a \cdot q_x(0)}$ can be directly recovered. When x is a non-leaf node, let z be the child nodes of x, i=index(z), $S_z' = \{$index$(z): z \in S_x\}$, and $\Delta_{i,S_x'}(0)$ be the Lagrange coefficients.

Calculate $$\Pi_{z \in S_x} e(D_x', E_{ci}')^{\Delta_{i,S_x'}(0)}$$

$$= \Pi_{z \in S_x} (e(g_1^{q_x(0)/RK_{ci}}, g_1^{r \cdot a \cdot RK_{ci}}))^{\Delta_{i,S_x'}(0)}$$

$$= \Pi_{z \in S_x} (e(g_1, g_1))^{r \cdot a \cdot q_x(0)} \Delta_{i,S_x'}(0)$$

$$= \Pi_{z \in S_x} (e(g_1, g_1))^{r \cdot a \cdot q_{parent(x)}(index(x))} \Delta_{i,S_x'}(0)$$

$$= \Pi_{z \in S_x} e(g_1, g_1)^{r \cdot a \cdot q_x(i)} \Delta_{i,S_x'}(0)$$

$$= e(g_1, g_1)^{r \cdot a \cdot q_x(0)}$$

Then, calculate $K_1^{a \cdot r}$. After that, solve $E' = (s\|SID) \cdot K_1^{a \cdot r}$ for s$\|$SID. Since SID has a fixed length, the data user can always solve for the decryption key by letting $K_s = s$. With the $K_s$, the ciphertext file m may be decrypted to obtain the plaintext file M. Therefore, different data users may access files of various security levels, realizing fine-grained access control throughout the entire lifecycle of the data.

Using the data. Having acquired the plaintext file, the data may be operated on. After the operation, a random number may be selected, and the data operation with a personal private key. The operation may be logged. When the data falls into a high protection level, then duplication and dissemination of the data need to be regulated to prevent the leakage of data with high protection level.

Data Destruction Stage:

The last stage in the data lifecycle is data destruction, where discrete destruction control can be practiced based on the data security identification. Specifically, the data security identification implementation can be stored separately from the physical data. Since the data security identification has already explicitly described the data attributes, it can be leveraged to track the access and flow of the data throughout its lifecycle for analysis and administration. The standards for data destruction will be decided based on critical information such as the confidentiality level and category of the data. Appropriate retention period and data expiry time are established based on the data security level. In this embodiment, the cloud server will automatically destroy a document upon expiration of the data. To ensure that the data is completely irrecoverable, the automatic update function of the DHT network node data is used to discard the index tuples <li, $C_{si}$> associated with the stored ciphertext components, forestalling the recovery of CM. Without the CM, the partial knowledge of $M_{dso}$ alone would be insufficient to yield the decrypted plaintext because only with the entire original ciphertext will we be able to use the symmetric key to acquire the decrypted plaintext file M. In this way, secure self-destruction of the data is hence achieved. To ensure the security of critical data, data destruction may be prearranged with data backup. Recovery after the data destruction will become extremely difficult, if not impossible, so measures must be in place to prevent the accidental loss of any essential information. For the data destruction, delicate destruction strategies must be formulated according to the confidentiality level and category of the data, with different data handled distinctly to meet their specific confidentiality needs. When dealing with files of high confidentiality levels, there should be additional measures to guarantee complete annihilation. Such sensitive data may cycle through multiple erase-overwrites to prevent any recovery.

Embodiment 2

Figure 5:
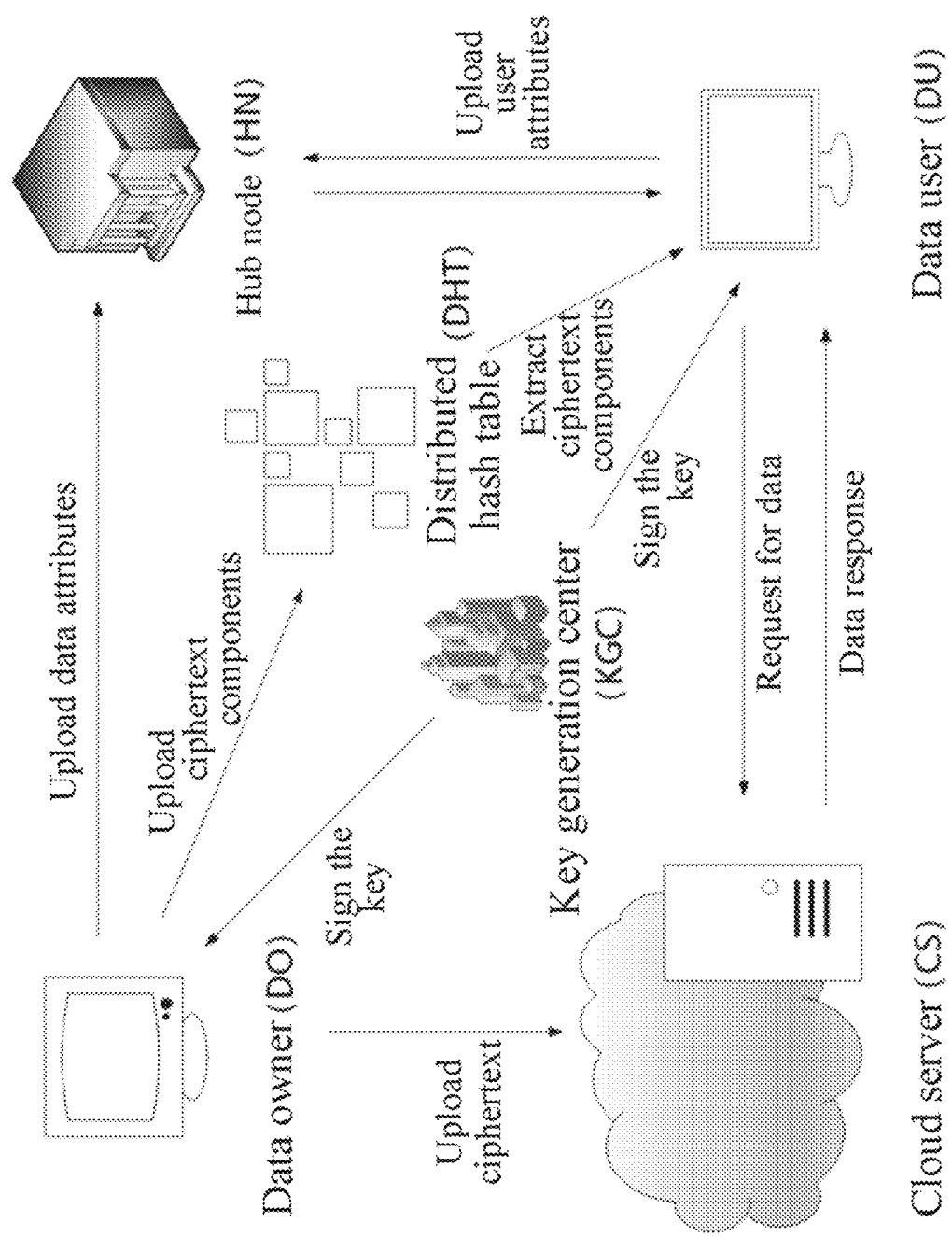
FIG. 5 is a block diagram of a full-link data security protection system of the present disclosure.

As shown in FIG. 5, this embodiment provides a full-link data security protection system for implementing the method of the above embodiment 1. The system includes: an initialization module, a key generation center, a data owner, a data user, a hub node, a cloud server, a DHT network, and an identifier building module.

In this embodiment, the initialization module is used to: initialize the key generation center.

In this embodiment, the key generation center (KGC) is used to: generate public parameters, calculate a public key for verifying a signature of the data owner; and generate a private key for the data user for signing.

In this embodiment, the data owner is used to: register with the key generation center using the identity $ID_u$ of the data owner; generate a private key; and sign a ciphertext based on the private key.

In this embodiment, the data user (DU), i.e., the one who uses the data, is used to: register with the key generation center using an identity $ID_t$ of the data user; and sign an operation message based on the private key.

In this embodiment, the identifier building module is used to: build a data security identification based on a category and security level of an object data; and verify a signed identifier.

In this embodiment, the hub node (HN) is used to: acquire a data security attribute set; and generate a decryption key. Assuming that the HN is honest and trustable, this embodiment generates the user's decryption private key through user attributes.

In this embodiment, the data owner (DO) is used to: generate a symmetric key based on a symmetric encryption algorithm; encrypt a plaintext file with the symmetric key to generate a ciphertext file. The symmetric key is associated with a security attribute of an encrypted data.

In this embodiment, the data owner is further used to: divide the ciphertext file into blocks to generate ciphertext components; calculate a virtual index and a data label for a data block; transmit the ciphertext components to a DHT network; and upload a tuple including the virtual index, the data block, and the data label to the cloud server.

In this embodiment, the hub node is further used to: apply re-encryption based on a re-encryption key generation algorithm to generate a re-encrypted ciphertext; the data user is further used to: acquire the re-encrypted ciphertext, which is then decrypted to obtain the signed identifier and a secret value; generate multiple distribution indexes based on the signed identifier; and acquire from the DHT network a tuple having a ciphertext component associated with the index.

In this embodiment, the data user is further used to: calculate a virtual index based on the signed identifier; acquire the tuple consisting of the virtual index, the data block and the data label from the cloud server; verify integrity of the ciphertext via a data signature and a ciphertext label; recover the data blocks of the ciphertext file corresponding to the ciphertext components using a Lagrange interpolation method; assemble the data blocks to acquire a complete ciphertext file that is decrypted to obtain the plaintext file based on the symmetric key.

In this embodiment, the cloud server (CS) is further used to: store a tuple including the virtual index, the data block, and the data label. This embodiment assumes that the cloud server is untrusted but honest.

In this embodiment, the distributed hash table (DHT) network is a decentralized storage network that supports redundancy. Information uniquely identified by key-value pairs can be dispersed throughout multiple nodes. The DHT network may be used to store the tuples generated from the ciphertext components, and has automatic data update functionalities. The index tuples associated with the stored ciphertext components may be discarded under preset conditions based on the data security identification, and the original data information will be irrevocably deleted after the automatic update.

The above embodiments are preferred embodiments of the present disclosure, but the embodiments of the present disclosure are not limited thereto. Any changes, modifications, substitutions, combinations, simplifications that do not depart from the spirit and principles of the present disclosure should be considered equivalent alternatives and are deemed within the scope of protection of the present disclosure.

What is claimed is:

1. A full-link data security protection method, comprising:
initializing, by an initialization module, a key generation center;
generating, by the key generation center, public parameters;
registering, by a data owner, an identity $ID_u$ of the data owner with the key generation center;
calculating, by the key generation center, a public key for verifying a signature of the data owner;
generating, by the data owner, a private key;
signing, by the data owner, a ciphertext based on the private key;
registering, by a data user, an identity $ID_t$ of the data user with the key generation center;
generating, by the key generation center, a private key for the data user for signing;
signing, by the data user, an operation message based on the private key;

at a data creation and collection stage:
building, by an identifier building module, a data security identification based on a category and security level of an object data;
verifying, by the identifier building module, a signed identifier;
acquiring, by a hub node, a data security attribute set;
generating, by the data owner, a symmetric key based on a symmetric encryption algorithm;
encrypting, by the data owner, a plaintext file with the symmetric key to generate a ciphertext file;
associating, by the data owner, the symmetric key with a security attribute of an encrypted data for implementing access control; and
generating, by the hub node, a decryption key;
at a data transmission and storage stage:
dividing, by the data owner, the ciphertext file into blocks to generate ciphertext components;
calculating, by the data owner, a virtual index and a data label for a data block;
transmitting, by the data owner, the ciphertext components to a distributed hash table (DHT) network node; and
uploading, by the data owner, a tuple comprising the virtual index, the data block, and the data label to a cloud server;
at a data processing and exchange stage:
applying, by the hub node, re-encryption based on a re-encryption key generation algorithm to generate a re-encrypted ciphertext;
acquiring, by the data user, the re-encrypted ciphertext, which is then decrypted to obtain the signed identifier and a secret value;
generating, by the data user, multiple distribution indexes based on the signed identifier;
acquiring, by the data user, from the DHT network node the tuple having a ciphertext component associated with the virtual index;
calculating, by the data user, a new virtual index based on the signed identifier;
acquiring, by the data user, the tuple consisting of the virtual index, the data block and the data label from the cloud server;
verifying, by the data user, integrity of the ciphertext via a data signature and a ciphertext label;
recovering, by the data user, the data blocks of the ciphertext file corresponding to the ciphertext components using a Lagrange interpolation method;
assembling, by the data user, the data blocks to acquire a complete ciphertext file that is decrypted to obtain the plaintext file based on the symmetric key;
at a data destruction stage:
under a preset condition, discarding, by the DHT network node, an index tuple associated with a stored ciphertext component based on the data security identification.

2. The method according to claim 1, wherein the public parameters of the key generation center are denoted as:
$G_1$, $G_2$, q, e, P, $PK_T$, $H_1$, g, $H_2$, $H_3$,
wherein $G_1$ denotes a cyclic additive group, $G_2$ denotes a cyclic multiplicative group, q denotes a prime number, e denotes a bilinear mapping, P denotes a generator of a cyclic additive group $G_1$, $PK_T$ denotes a public key of the key generation center, g denotes a key calculation algorithm, and $H_1$, $H_2$ and $H_3$ each denote a hash function.

3. The method according to claim 1, wherein, after a request for registration by the data owner is received, the key generation center further comprise steps of:
selecting a random number $T_i$;
selecting a secret value $S_{ki}$ shared with the data owner;
selecting a secret value $S_{ti}$ shared between the data owner and the data user; and
calculating the public key for verifying the signature of the data owner, denoted as:

$$V_i = S_{ki} \oplus ID_u;$$

wherein $\oplus$ denotes exclusive OR;
transmitting, by the key generation center, a<$D_i$, $S_{ki}$, $S_{ti}$, $S_i$> to the data owner;
wherein $D_i=(D_{i,1}, D_{i,2})$, $D_{i,1}=r_i P$, $D_{i,2}=V_i \oplus H_1(S_{ti} \cdot D_{i,1})$ and $S_i=SK_T \cdot H_1(V_i)$, the P denotes a generator of a cyclic additive group $G_1$, $H_1$ denotes a hash function, $SK_T$ denotes a random number $SK_T \in Z_p^*$ taken as a private key of the key generation center, and $Z_p^*$ denotes positive prime integers.

4. The method according to claim 3, wherein the data owner $DO_i$ calculates the private key by:

$$sk_i = S_i + S_{ti} \cdot S_i \cdot H_2(D_i \| t_i),$$

wherein $\|$ denotes concatenation of bit strings, $t_i$ denotes time the private key is generated, and $H_2$ denotes the hash function.

5. The method according to claim 1, wherein steps of:
generating, by the data owner, the symmetric key based on the symmetric encryption algorithm; and encrypting, by the data owner, the plaintext file with the symmetric key to generate the ciphertext file comprises:
for achieving fine-grained access control, encrypting the symmetric key to form the ciphertext denoted as:

$$E=(A, E'=(s\|SID) \cdot K_1^a, \{E_{ci}=pt_{ci}^a\}_{1 \le ci \le l});$$

$$s=K_s;$$

$$pt_{ci}=g_1^{t_{ci}};$$

$$K_1=e(g_1,g_2)^y;$$

wherein A denotes the data security attribute set, $K_s$ denotes the symmetric key, SID denotes the signed identifier, $\alpha$ denotes a random number, $\|$ denotes concatenation of bit strings, $t_{ci}$ denotes l random numbers selected for l attributes in the data security attribute set, $t_{ci} \in Z_p'$, $1 \le ci \le l$, $Z_p^*$ denotes positive prime integers, $g_1$ denotes a generator of a cyclic multiplicative group $G'$, e denotes a bilinear mapping, and y denotes a random number.

6. The method according to claim 3, wherein the steps of:
dividing, by the data owner, the ciphertext file into blocks to generate the ciphertext components; and calculating, by the data owner, the virtual index and the data label for the data block comprises:
dividing, by the data owner, the ciphertext file into v data blocks and from which, extracting data blocks CM, with remaining data blocks being denoted as $M_{dso}$,
wherein the virtual index is denoted as:

$$\zeta_c = c \cdot SID,$$

wherein c denotes an index corresponding to a message block $m_c$, $m_c \in M_{dso}$, and SID denotes the signed identifier, wherein the data label is denoted as:

$\sigma_{v_c} = (\sigma_{m_c}, D_i, Y_c, T_p, t_i);$ $\sigma_{m_c} = sk_i + \delta_c \cdot y_c;$ $Y_c = y_c \cdot P;$ $\delta_c = H_3(D_i \| Y_c \| m_c \| T_i \| \zeta_c),$ wherein $sk_i$ denotes a private key of the data owner, P denotes a generator of a cyclic additive group $G_1$, $H_3$ denotes a hash function, $t_c$ denotes a random number, $T_i$ denotes a timestamp of the signature, and $t_i$ denotes time the private key is generated.

7. The method according to claim 6, wherein, for the transmitting the ciphertext components to the DHT network node, the ciphertext components are denoted as:

$S_{cs} = (C_{s1}, \ldots, C_{si}, \ldots, C_{sN});$ $C_{si} = (Q_1(x_i), Q_2(x_i), \ldots, Q_{v+1}(x_i));$ $Q_1(x) = CM_1 + o_1 x^1 + o_1 x^2 + \ldots + o_{k-1} x^{k-1};$ $Q_i(x) = CM_i + o_1 x^1 + o_1 x^2 + \ldots + o_{k-1} x^{k-1};$ $Q_v(x) = CM_v + o_1 x^1 + o_1 x^2 + \ldots + o_{k-1} x^{k-1};$ $Q_{v+1}(x) = Cc + o_1 x^1 + o_1 x^2 + \ldots + o_{k-1} x^{k-1};$ $Cc = H_2(CM_1 \| CM_2 \| \ldots \| CM_v);$ $CM \; 32 \; \{CM_1, CM_2, \ldots, CM_v\},$ wherein $o_{k-1}$ denotes k−1 numbers selected from a finite field, $H_2$ denotes the hash function;
using a data identification SID as a seed for a secure pseudo-random number generator to generate N distribution indexes l1, l2, . . . , lN;
producing, from the ciphertext components associated with the indexes, N tuples <li, $C_{si}$>; and
distributing all of the tuples to the DHT network node for storage.

8. The method according to claim 1, wherein the applying, by the hub node, re-encryption based on the re-encryption key generation algorithm to generate the re-encrypted ciphertext is denoted as:

$C_b = (A', E' = (s \| SID) \cdot K_1^{a-r}, \{E_{ci}' = ((pt_{ci}^a)^{RK_{ci}^{Alice \to Bob}})^T\}_{1 \le ci \le l});$ $RK_i^{Alice \to Bob} = t'_{l \psi l} / t_{\| \psi' \|};$ $s = K_s;$ $pt_{ci} = g_1^{tci};$ $K_1 = e(g_1, g_1)^y,$ wherein A' denotes the data security attribute set, $t_{ci}$ denotes a random number selected from the data security attribute set, $\psi$ and $\psi'$ denote an access control hierarchy defined by a data attribute and an access control hierarchy defined by a user attribute, $K_s$ denotes the symmetric key, SID denotes the signed identifier, $\alpha$ denotes a random number, $\|$ denotes concatenation of bit strings, $g_1$ denotes a generator of a cyclic multiplicative group G', e denotes a bilinear mapping, y denotes a random number, l denotes the number of attribute; $1 \le ci \le l$, $y \in Z_p^*$, and $Z_p^*$ denotes positive prime integers.

9. The method according to claim 7, wherein the verifying, by the data user, integrity of the ciphertext specifically comprises:
verifying, by the data user, $CM_1', CM_2', \ldots, CM_v'$ regenerated from the extracted ciphertext components; and
determining whether $H_2(CM_1' \| CM_2' \| \ldots \| CM_v')$ equals to Cc;
verifying v corresponding tuples $(\zeta_c, m_c, \sigma_{v_c})$ returned from the cloud server;
for each tuple, calculating $\delta_c = H_3(D_i \| Y_c \| m_c \| T_i \| \zeta_c)$; and
batch verifying the equation:

$$e\left(\sum_{c=1}^{v} \sigma_{m_c}, P\right) = e\left(\sum_{c=1}^{v} H_1(V_i)(1 + S_{ti} \cdot H_2(D_i \| t_i)), PK_T\right) e\left(\sum_{c=1}^{v} \delta_c \cdot Y_c\right),$$

wherein $H_3$ denotes a hash function, $V_i$ denotes the public key signed by the data owner, $S_{ti}$ denotes a secret value shared between the data owner and the data user, $PK_T$ denotes the public key of the key generation center, and $t_i$ denotes the time the private key is generated.

10. A full-link data security protection computer system, comprising:
an initialization module, a key generation center, a data owner computer, a data user computer, a network hub node, a cloud server, a distributed hash table (DHT) network node, and an identifier building module, wherein the computer system is configured to,
initialize, by using the initialization module, the key generation center;
generate, by using the key generation center, public parameters;
calculate, by using the key generation center, a public key for verifying a signature of the data owner computer;
generate, by using the key generation center, a private key for the data user computer for signing;
use the data owner computer to:
register with the key generation center using an identity $ID_u$ of the data owner computer;
generate a private key; and
sign a ciphertext based on the private key;
use the data user computer to:
register with the key generation center using an identity $ID_t$ of the data user computer; and
sign an operation message based on the private key;
build, by using the identifier building module, a data security identification based on a category and security level of an object data;
verify, by using the identifier building module, a signed identifier;
acquire, by using the network hub node, a data security attribute set;
generate, by using the network hub node, a decryption key;
further use the data owner computer to:
generate a symmetric key based on a symmetric encryption algorithm;
encrypt a plaintext file with the symmetric key to generate a ciphertext file; and
associate the symmetric key with a security attribute of an encrypted data for implementing access control; and
further use the data owner computer to:
divide the ciphertext file into blocks to generate ciphertext components;

calculate a virtual index and a data label for a data block;
transmit the ciphertext components to a DHT network node; and
upload a tuple comprising the virtual index, the data block, and the data label to the cloud server;
apply, by using the network hub node, re-encryption based on a re-encryption key generation algorithm to generate a re-encrypted ciphertext;
further use the data user computer to:
acquire the re-encrypted ciphertext, which is then decrypted to obtain the signed identifier and a secret value;
generate multiple distribution indexes based on the signed identifier; and
acquire from the DHT network a tuple having a ciphertext component associated with the virtual index;
further use the data user computer to:
calculate a new virtual index based on the signed identifier;
acquire the tuple consisting of the virtual index, the data block and the data label from the cloud server;
verify integrity of the ciphertext via a data signature and a ciphertext label;
recover the data blocks of the ciphertext file corresponding to the ciphertext components using a Lagrange interpolation method; and
assemble the data blocks to acquire a complete ciphertext file that is decrypted to obtain the plaintext file based on the symmetric key;
use the cloud server to store a tuple comprising the virtual index, the data block, and the data label;
use the DHT network node to:
store the tuples generated from the ciphertext components; and
under a preset condition, discard an index tuple associated with a stored ciphertext component based on the data security identification.

* * * * *